(12) United States Patent
Wittenberg et al.

(10) Patent No.: US 7,974,506 B2
(45) Date of Patent: Jul. 5, 2011

(54) DEVICE FOR EMITTING ELECTROMAGNETIC RADIATION AND DISPLAY DEVICE

(75) Inventors: Dirk Wittenberg, Munich (DE); Kai Franz, Regensburg (DE)

(73) Assignee: OSRAM Gesellschaft mit beschränkter Haftung, München (DE)

( * ) Notice: Subject to any disclaimer, the term of this patent is extended or adjusted under 35 U.S.C. 154(b) by 816 days.

(21) Appl. No.: 11/986,952

(22) Filed: Nov. 27, 2007

(65) Prior Publication Data

US 2008/0157009 A1    Jul. 3, 2008

(30) Foreign Application Priority Data

Nov. 28, 2006   (DE) .................. 10 2006 056 150

(51) Int. Cl.
*G02B 6/26* (2006.01)
(52) U.S. Cl. ............... 385/31; 385/34; 385/43
(58) Field of Classification Search .......... 359/109;
256/429, 154; 250/494.1; 372/34; 362/85;
285/31, 34, 43, 901
See application file for complete search history.

(56) References Cited

U.S. PATENT DOCUMENTS

| | | | | | |
|---|---|---|---|---|---|
| 5,255,171 | A | * | 10/1993 | Clark | 362/231 |
| 5,553,088 | A | * | 9/1996 | Brauch et al. | 372/34 |
| 6,215,464 | B1 | * | 4/2001 | Jensen | 345/84 |
| 6,272,265 | B1 | * | 8/2001 | Franklin | 385/31 |
| 6,304,693 | B1 | * | 10/2001 | Buelow et al. | 385/31 |
| 6,385,507 | B1 | * | 5/2002 | Buijtels | 700/245 |
| 6,422,710 | B1 | | 7/2002 | Herzog et al. | |
| 6,574,030 | B1 | * | 6/2003 | Mosier | 359/267 |
| 6,608,614 | B1 | | 8/2003 | Johnson | |
| 6,849,308 | B1 | * | 2/2005 | Speakman et al. | 427/595 |
| 2002/0021564 | A1 | * | 2/2002 | Cho et al. | 362/97 |
| 2002/0149495 | A1 | | 10/2002 | Schach et al. | |
| 2002/0196502 | A1 | * | 12/2002 | Perner | 359/154 |
| 2006/0001786 | A1 | * | 1/2006 | Creemers | 349/1 |
| 2006/0056791 | A1 | * | 3/2006 | Tzschoppe | 385/146 |
| 2006/0152931 | A1 | * | 7/2006 | Holman | 362/297 |
| 2006/0262310 | A1 | * | 11/2006 | Starry et al. | 356/429 |
| 2006/0290844 | A1 | * | 12/2006 | Epstein et al. | 349/113 |
| 2007/0147752 | A1 | * | 6/2007 | Weisberg et al. | 385/123 |
| 2007/0206186 | A1 | * | 9/2007 | Sharma | 356/317 |
| 2008/0062116 | A1 | * | 3/2008 | Morbieu et al. | 345/102 |

(Continued)

FOREIGN PATENT DOCUMENTS

DE   100 21 099   11/2001

(Continued)

*Primary Examiner* — Jack I Berman
*Assistant Examiner* — Johnnie L Smith
(74) *Attorney, Agent, or Firm* — Cohen Pontani Lieberman & Pavane LLP

(57) ABSTRACT

A device for emitting a first and a second electromagnetic radiation (13, 23, 53) via a radiation coupling-out surface (5) along a device beam path. A first radiation-emitting arrangement (1) has at least one first radiation-emitting component (10) which emits the first electromagnetic radiation (13). A second radiation-emitting arrangement (2) has at least one second radiation-emitting component (20) which emits the second electromagnetic radiation (23). Furthermore, the device has a radiation-directing element (3), wherein the radiation coupling-out surface (5) is arranged in the beam path of the second radiation-emitting arrangement (2) and the radiation-directing element (3) directs the first electromagnetic radiation (13) to the radiation coupling-out surface (5).

44 Claims, 5 Drawing Sheets

U.S. PATENT DOCUMENTS

| | | | |
|---|---|---|---|
| 2008/0074899 A1* | 3/2008 | Wang et al. | 362/600 |
| 2008/0101064 A1* | 5/2008 | Draganov et al. | 362/231 |
| 2008/0170392 A1* | 7/2008 | Speier et al. | 362/227 |
| 2008/0198597 A1* | 8/2008 | Blumel | 362/247 |
| 2009/0067153 A1* | 3/2009 | Takeda et al. | 362/85 |

FOREIGN PATENT DOCUMENTS

| | | |
|---|---|---|
| DE | 102 11 270 | 10/2003 |
| EP | 1 600 929 | 11/2005 |
| WO | WO 2006/031545 | 3/2006 |
| WO | WO 2006/114750 | 11/2006 |

* cited by examiner

DEVICE FOR EMITTING ELECTROMAGNETIC RADIATION AND DISPLAY DEVICE

RELATED APPLICATION

This application claims the priority of German patent application no. 10 2006 056 150.3 filed Nov. 28, 2006, the entire content of which is hereby incorporated by reference.

FIELD OF THE INVENTION

The present invention relates to a device for emitting electromagnetic radiation and to a display device utilizing such device for emitting electromagnetic radiation.

SUMMARY OF THE INVENTION

One object of the present invention is to provide a device for emitting a first and a second electromagnetic radiation via a radiation coupling-out surface.

Another object of the present invention is to provide a display device comprising such a device.

These and other objects are attained in accordance with one aspect of the present invention directed to a device for emitting a first and a second electromagnetic radiation via a radiation coupling-out surface along a device beam path. A first radiation-emitting arrangement has at least one first radiation-emitting component which emits the first electromagnetic radiation. A second radiation-emitting arrangement has at least one second radiation-emitting component which emits the second electromagnetic radiation. The device also comprises a radiation-directing element.

The radiation coupling-out surface is arranged in the beam path of the second radiation-emitting arrangement, and the radiation-directing element directs the first electromagnetic radiation to the radiation coupling-out surface.

The first electromagnetic radiation and the second electromagnetic radiation can comprise wavelengths from an ultraviolet to infrared wavelength range and can be in particular wavelengths from a visible wavelength range and hence be visible light. Particularly preferably, such wavelengths and wavelength ranges can be emitted which can provide for an observer a white and in particular a cold-white or a warmwhite luminous impression. Furthermore, the first and/or the second electromagnetic radiation can have wavelengths or wavelength ranges which can provide for an observer a colored luminous impression. The first electromagnetic radiation and the second electromagnetic radiation can thereby be identical or different from one another with regard to their respective spectral components.

In a further embodiment, the first electromagnetic radiation is directed in the direction of the beam path of the second electromagnetic radiation by the radiation-directing element. As a result, the first electromagnetic radiation and the second electromagnetic radiation can advantageously be emitted from the radiation coupling-out surface in the same direction. In particular, the radiation-directing element can direct the first electromagnetic radiation to the radiation coupling-out surface in such a way that the beam path of the first and the second radiation-emitting arrangement is led into the common device beam path of the device. In particular, the radiation coupling-out surface can have a main extension direction. In this case, the first radiation-emitting arrangement can be arranged laterally offset with respect to the radiation coupling-out surface. In particular, this can mean that, in a plan view of the radiation coupling-out surface, the first radiation-emitting arrangement appears in a manner arranged laterally offset with respect to the radiation coupling-out surface.

In a further embodiment, the radiation-directing element has lateral surfaces and main surfaces. In this case, the first electromagnetic radiation can be radiated into the radiation-directing element by the first radiation-emitting arrangement via a lateral surface and can be directed toward a main surface. One of the main surfaces can at least partly form the radiation coupling-out surface.

Furthermore, the first electromagnetic radiation can be emitted into a solid angle range in which the radiation coupling-out surface is not arranged or is only partly arranged. It can be particularly advantageous, for example, if the first electromagnetic radiation is collimated and/or shaded in such a way that the first electromagnetic radiation is emitted principally parallel to the radiation coupling-out surface.

In one preferred embodiment, the first electromagnetic radiation is emitted at least via a first partial region of the radiation coupling-out surface, and the second electromagnetic radiation is emitted at least via a second partial region of the radiation coupling-out surface. In this case, the first partial region and the second partial region can comprise in each case partial regions of the radiation coupling-out surface which are contiguous or else arranged separately from one another. In this case, the first partial region and the second partial region can be different from one another, for example. This can mean, in particular, that the first partial region and the second partial region are arranged alongside one another, for example adjacent and adjoining one another. In particular, the first partial region can preferably enclose the second partial region. Furthermore, the first partial region and the second partial region can also at least partly overlap. In this case, it can also be that the first partial region completely covers the second partial region; this means that the second partial region is a partial region of the first partial region. Particularly preferably, the second partial region is delimited by the first partial region on at least two sides. In this case as well, the first partial region and the second partial region can at least partly overlap or they can be different from one another. Furthermore, the second partial region can also be delimited by the first partial region on all sides. Particularly preferably, the second partial region can be arranged centrally with regard to the first partial region.

In a further embodiment, the first electromagnetic radiation has a first luminance in the first partial region. Thereby, the luminance of the first electromagnetic radiation in the first partial region can be constant or have a luminance gradient over the first partial region. Furthermore, it can be possible for the first electromagnetic radiation to have a second luminance in the second partial region, which second luminance is not greater than the first luminance at any point in the second partial region. By way of example, the second luminance can be less than 50%, in particular less than 25% or in particular less than 10% of the first luminance of the first electromagnetic radiation in the first partial region. In particular, the luminance of the first electromagnetic radiation in the first and/or in the second partial region can vary continuously or change abruptly upon the transition from the first to the second partial region.

In a further exemplary embodiment, the second electromagnetic radiation in the second partial region has a luminance preferably having a distribution such that the luminance of the entire electromagnetic radiation emitted by the radiation coupling-out surface, comprising the first and the second electromagnetic radiation, in particular in the first and/or in the second partial region, is equal or approximately equal to the first luminance of the first electromagnetic radiation in the first partial region. In this case, "approximately equal" can mean that the luminance in the first and/or in the second partial region deviates by not more than 10%, preferably by not more than 5%, from the first luminance in the first partial region.

In one preferred embodiment, the radiation-directing element is arranged in the beam path of the second radiation-emitting arrangement.

In a particularly preferred embodiment, the radiation-directing element has a light guide or comprises a light guide which has a radiation entrance surface, via which the first electromagnetic radiation can be coupled into the light guide. Furthermore, the light guide can have a radiation exit surface, via which the first electromagnetic radiation can be coupled out. Furthermore, the light guide can preferably have a surface, also called rear-side surface hereinafter, which is arranged opposite the radiation exit surface and via which the second electromagnetic radiation can at least partly be coupled into the light guide. In this case, the second electromagnetic radiation can then also be coupled out again via the radiation exit surface of the light guide. Particularly preferably, the second radiation-emitting arrangement can be arranged centrally with regard to the rear-side surface.

In one preferred embodiment, the radiation exit surface of the light guide forms a part of the radiation coupling-out surface of the device or is the radiation coupling-out surface of the device.

In a particularly preferred embodiment, the radiation entrance surface, via which the first electromagnetic radiation can be coupled into the light guide, is not arranged parallel to the radiation coupling-out surface. In particular, this can mean that the radiation entrance surface is not arranged parallel to the radiation exit surface of the light guide. By way of example, the radiation entrance surface can in this case be a lateral surface of the light guide. Particularly preferably, the light guide is embodied as a sheet-like, in particular plate-like, light guide for this purpose. This can mean, in particular, that the light guide has two main surfaces arranged opposite to one another, wherein one main surface has, or forms, the radiation exit surface, and the other main surface is the rear-side surface facing the second radiation-emitting arrangement. In this case, at least one lateral surface of the light guide embodied in sheet-like fashion can have, or form, the radiation entrance surface for the first electromagnetic radiation. In this case, the light guide can be formed as a body which is shaped in sheet-like fashion and which has two mutually opposite main surfaces having for example the form of an n-sided polygon (n greater than or equal to 3), a circle, an ellipse or a combination thereof. Particularly preferably, the light guide is formed as a flat cuboid which can have a small thickness in comparison with the dimensions of the main surfaces. Furthermore, the light guide can thereby be formed in planar fashion, that means parallel to a plane with regard to the radiation exit surface and the rear-side surface, or in curved fashion. In this case, in particular the radiation exit surface and the rear-side surface can have a curvature.

The light guide can comprise in particular a moldable plastic. This can mean that the light guide can be produced by a molding process, for instance casting, pressing or injecting, in particular injection molding, transfer molding or injection-compression molding. Suitable materials for such a light guide can be for example poly-methyl-methacrylate (PMMA), polycarbonate or polystyrene. Furthermore, the light guide can also comprise epoxide and/or silicone.

In a further embodiment, the radiation-directing element has a reflective component such as, for instance, a mirror, a reflective film or a reflective layer, which can be arranged at least partly in the beam path of the first electromagnetic radiation. In particular, the radiation-directing element can have a light guide as described further above, in which a reflective component such as a mirror, for instance, is at least partly arranged on the rear-side surface arranged opposite the radiation exit surface. As an alternative or in addition, a reflective layer can also be applied on the rear-side surface. In particular, the rear-side surface of the light guide opposite the radiation exit surface can be shaped in such a way that it is suitable, together with the reflective layer or the reflective component, for reflecting electromagnetic radiation to the radiation exit surface. By way of example, the rear-side surface can have reflective surface regions, for instance in the form of grooves or a microprism structuring, which form an angle with the direction of propagation of the first electromagnetic radiation such that at least part of the first electromagnetic radiation can be directed toward the radiation exit surface by said surface regions.

In a further embodiment, the light guide has an opening extending from the radiation exit surface to the rear-side surface, such that a continuous opening is present in the light guide. In particular, it can be advantageous in this case if the opening is present in the second partial region of the radiation coupling-out surface or completely occupies the latter. As a result, the opening can advantageously be arranged in the beam path of the second electromagnetic radiation, such that the second electromagnetic radiation can be emitted directly, that is to say without having to be coupled into the light guide, via the radiation coupling-out surface. For this purpose, for example the top side of the opening, which can lie in a plane or surface with the radiation exit surface of the light guide, can form a part of the radiation coupling-out surface.

In a further embodiment, the light guide has sidewalls in the region of the opening, the sidewalls adjoining the opening. In this case, the sidewalls can connect the radiation exit surface and the surface of the light guide arranged opposite the radiation exit surface, or can adjoin them. In particular, the sidewalls can in this case adjoin the radiation exit surface. Particularly preferably, the sidewalls of the opening have a reflective layer or coating. The reflective layer or coating can be embodied in such a way that for example the first electromagnetic radiation, which impinges on a sidewall within the light guide, is reflected from said sidewall back into the light guide. As an alternative or in addition, the reflective layer or coating can be embodied in such a way that the second electromagnetic radiation, which impinges on at least one sidewall within the opening, is reflected from said sidewall. In particular, as a result of this it can be possible, for example, for the second partial region of the radiation coupling-out surface to be formed by the opening, while the first part of the radiation coupling-out surface is formed by the light guide.

In a further embodiment, the first radiation-emitting component and/or the second radiation-emitting component is embodied as a point-like, as a linear or as a sheet-like radiation source. In particular, a first and/or second radiation-emitting component embodied as a linear radiation source can in this case be embodied preferably in extended fashion, that is to say parallel to a straight line, but also in bent fashion. In particular, the first radiation-emitting component and/or the second radiation-emitting component can comprise a fluorescence lamp, in particular a cold cathode fluorescence lamp (CCFL), a hot cathode fluorescence lamp (HCFL), an external electrode fluorescence lamp (EEFL) or a flat fluorescence lamp (FFL). As an alternative or in addition, the first and/or the second radiation-emitting component can have or be an electroluminescence film. Furthermore, the first and/or the second radiation-emitting component can comprise a light-emitting diode, in particular an inorganic or an organic light-emitting diode. In this case, the light-emitting diode can have a mounting plane and can emit electromagnetic radiation preferably directed away from the mounting plane, that is to say upward, or along the extension direction of the mounting plane, that is to say laterally. In this case, it can furthermore be advantageous if a radiation-emitting component comprises a plurality of light-emitting diodes which emit the same or in each case different electromagnetic radiation. Particularly in the case of a first and/or second radiation-emitting component having a plurality of LEDs, the color locus of the first and/or second electromagnetic radiation can be varied and/or optimized by an active driving of the LEDs.

Furthermore, the first and/or the second radiation-emitting arrangement can have a reflector suitable for directing and/or focusing or collimating the emitted first and/or second electromagnetic radiation in a direction and/or a spatial region. In this case, the reflector can be embodied as a reflector housing in which the first and/or second radiation-emitting component or else in each case a plurality thereof is arranged and which encloses the first and/or second radiation-emitting component for example apart from one side. The reflector can also be embodied as part of a radiation-emitting component. In this case, the reflector can have for example a parabolic, a polygonal, for instance a rectangular or trapezoidal, or a circular or elliptical cross section or else be formed as an involute reflector, in particular in the form of a circle involute.

In a further preferred embodiment, a diffuser is arranged in the beam path of the first and/or the second electromagnetic radiation. This can mean that the diffuser is disposed downstream of the first and/or the second radiation-emitting arrangement. In this case, a diffuser can have scattering centers by which a spatial and/or angular distribution of an electromagnetic radiation can be increased and/or randomized. By way of example, such scattering centers can be reflective or radiation-refractive. In this case, scattering centers in the form of particles can be embedded in a transparent matrix, for instance composed of a plastic. As an alternative, scattering centers can also be formed by surface or interface structures, which can be either irregular or regular. The surface structures can be formed on radiation entrance surfaces or on radiation exit surfaces of the diffuser. Irregular structures can be formed for example by a roughness structure of a surface, while regular structures can have for example a microprism structuring. Furthermore, scattering centers can be formed by a so-called micro-dot structure. This can mean that punctiform or particle-type regions are arranged as scattering centers on a surface or in the interior of the diffuser, which have reflective or refractive properties. The diffuser can preferably have a homogeneous distribution of the scattering centers, that is to say for example a uniform distribution of particles or a uniform roughness or a uniform and homogeneous microprism structuring. As an alternative, the diffuser can have regions having an increased scattering center density and regions having a reduced scattering center density, wherein the transition between said regions can be continuous or sudden.

In particular, the radiation-directing element can comprises a diffuser. As a result, it is advantageously possible, by means of the radiation-directing element, by way of example, for the first electromagnetic radiation to be directed and also for the spatial and/or angular distribution of the first electromagnetic radiation to be increased. By way of example, the radiation-directing element can have a mirror or a reflective layer having a roughened or structured surface. Furthermore, the radiation-directing element can have a light guide with scattering centers as described above. A radiation-directing element with diffuser can furthermore be suitable for at least partly intermixing first and second electromagnetic radiation.

In a further embodiment, the reflector or the reflector housing of the first and/or the second radiation-emitting arrangement is also formed as a diffuser. This can mean, in particular, that the reflector or the reflector housing has an at least partly diffusely reflective surface, for instance with a roughness structure or a microprism structuring.

In a further embodiment, the diffuser is disposed downstream of the radiation-directing element in the beam path of the first and/or the second electromagnetic radiation. In particular, this can mean that the diffuser has a radiation exit surface which forms the radiation coupling-out surface of the device or a part thereof. Furthermore, the radiation-directing element can be disposed downstream of the diffuser in the beam path of the first and/or the second radiation-emitting arrangement. By way of example, for this purpose the first and/or the second radiation-emitting arrangement can comprise the diffuser. Furthermore, the diffuser can be arranged in or above an opening of a radiation-directing element formed as a light guide. It is thereby possible for the diffuser to increase only the spatial and/or angular distribution of the second electromagnetic radiation passing through the opening of the light guide.

In one preferred embodiment, the first radiation-emitting arrangement has a plurality of first radiation-emitting components arranged on the same side or on different sides of the radiation-directing element. Particularly preferably, the radiation-directing element has a first side, on which at least one of the plurality of the first radiation-emitting components is arranged, and also a second side, on which at least one further one of the plurality of the first radiation-emitting components is arranged. In this case, the first and the second side are preferably different from one another. In particular, the first radiation-emitting components can be arranged in such a way that they have beam paths running toward one another. If the radiation-directing element is formed as a light guide, this can mean that the light guide has for example a plurality of radiation entrance surfaces on a plurality of sides and in each case one of the plurality of the radiation entrance surfaces is disposed downstream of at least one first radiation-emitting component. Particularly preferably, the first and the second side are sides which are opposite one another in the case of a radiation-directing element formed as a light guide. In particular, the sides can adjoin the radiation exit surface of the light guide and also the rear-side surface arranged opposite the radiation exit surface and can thus be formed as lateral surfaces of the light guide. Furthermore, first radiation-emitting components can be arranged at adjacent, mutually adjoining sides or lateral surfaces or furthermore also at all sides or lateral surfaces of the light guide.

In a further preferred embodiment, the radiation-directing element and the plurality of the first radiation-emitting components are arranged alongside one another, that is to say for instance in a surface. In this case, the surface can be in particular a plane. As an alternative, the surface can also be curved. In particular, the surface can also be a virtual surface that is suitable for describing the geometry of the radiation-directing element in a simplifying manner. Particularly preferably, the surface can be parallel to the radiation coupling-out surface. By way of example, the radiation-directing element can have a plate-like, in particular a flat cuboidal light guide. The virtual surface for the simplified geometrical description of the light guide can then be for instance a plane of symmetry of the cuboid parallel to the radiation exit surface.

In a further embodiment, the second radiation-emitting arrangement has a plurality of second radiation-emitting components. In particular, the plurality of second radiation-emitting components can be arranged adjacent to one another, that is to say for example in the same reflector box.

A plurality of first and/or second radiation-emitting components can be for example a row- and/or column-like arrangement of radiation-emitting components mentioned further above, that is to say an LED array, for instance.

In a further embodiment, an optical element is disposed downstream of the radiation coupling-out surface. Such an optical element can be for example a diffuser, for instance as described further above, a wavelength converter, a lens or a polarizer. In particular, it can be advantageous if the optical element is a polarizer which is transmissive for electromagnetic radiation having a polarization direction and reflective for electromagnetic radiation having the polarization direction orthogonal with respect thereto. In particular, such a polarizer can have an advantageous effect if the electromagnetic radiation reflected by the polarizer is reflected back to the polarizer again at a reflective layer, a mirror or a reflector, wherein it can be advantageous in this case if the polarization direction of the electromagnetic radiation is then oriented according to the transmissive polarization direction of the polarizer. For this purpose, the device can comprise for example a further suitable optical element, for instance a wave plate.

In a further embodiment, the electromagnetic radiation emitted by the radiation coupling-out surface provides for an observer a homogeneous luminous impression. In this case, "homogeneous" can mean a uniform luminance distribution and/or a uniform color impression. In particular, such a device can be used for example suitably as backlighting for display devices. As an alternative, the radiation coupling-out surface can also give an observer an inhomogeneous luminous impression. In this case, "inhomogeneous" can mean in particular a color or brightness profile on the radiation coupling-out surface. By way of example, the radiation coupling-out surface can give a brighter luminous impression in the second partial region of the radiation coupling-out surface than in the first partial region, or vice versa. Furthermore, an observer can be given a different color impression in the second partial region than in the first partial region.

A display device in accordance with at least one embodiment of the invention comprises, in particular, a device in accordance with at least one of the abovementioned embodiments and a liquid crystal matrix. In this case, the liquid crystal matrix is particularly preferably disposed downstream of the radiation coupling-out surface of the device in the device beam path, that means in the beam path of the first and second electromagnetic radiation which are emitted by the radiation coupling-out surface. The liquid crystal matrix can be formed as an active or passive liquid crystal matrix and can in this case have individual pixels or subpixels.

DETAILED DESCRIPTION OF THE DRAWINGS

In the exemplary embodiments and figures, identical or identically acting constituent parts can in each case be provided with the same reference symbols. The elements illustrated and their size relationships among one another should not be regarded as true to scale, in principle; rather, individual elements such as, for example, layers, structural parts, components and regions can be illustrated with an exaggerated thickness or size dimensioning for the sake of better depictability and/or for the sake of better understanding.

Figure 1A:
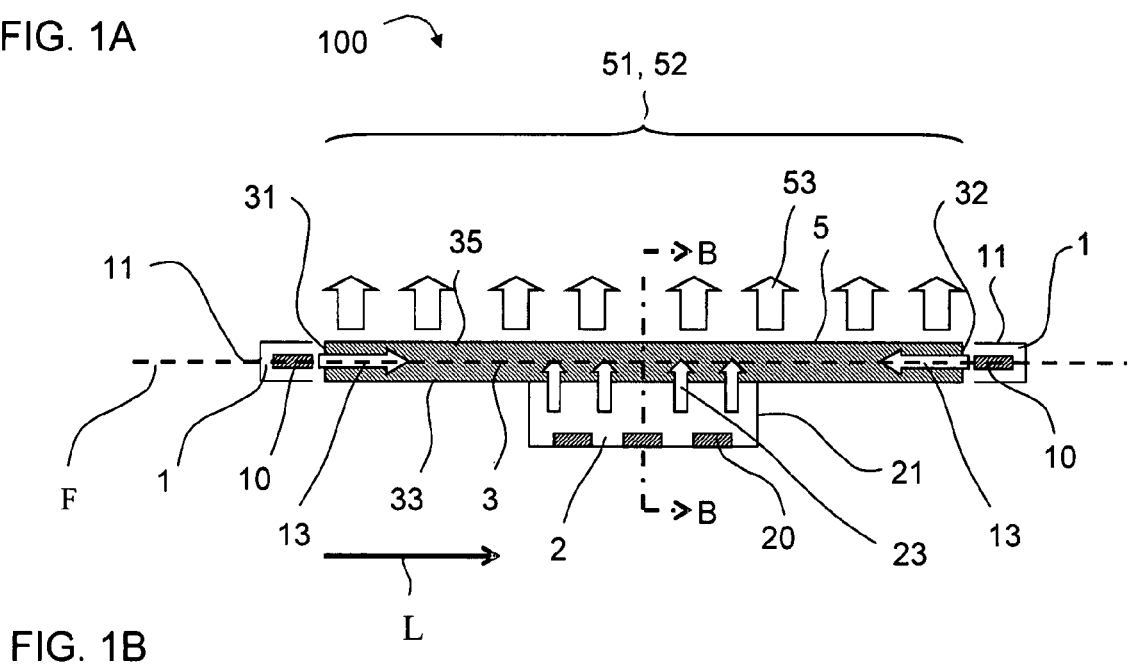
FIGS. 1A and 1B show schematic illustrations of a device in accordance with one exemplary embodiment.
Figure 1B:
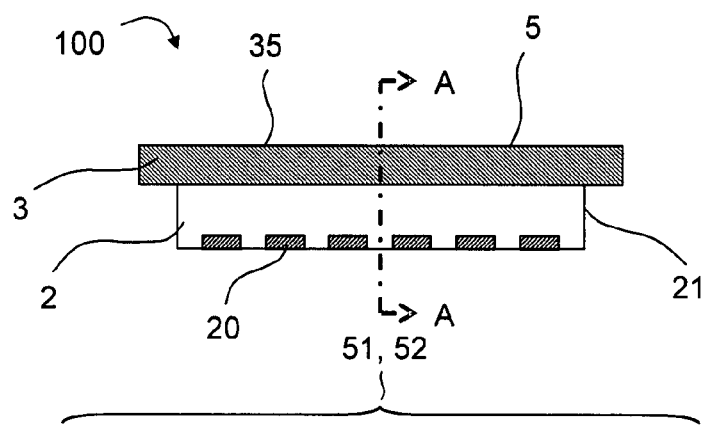
Figure 1C:
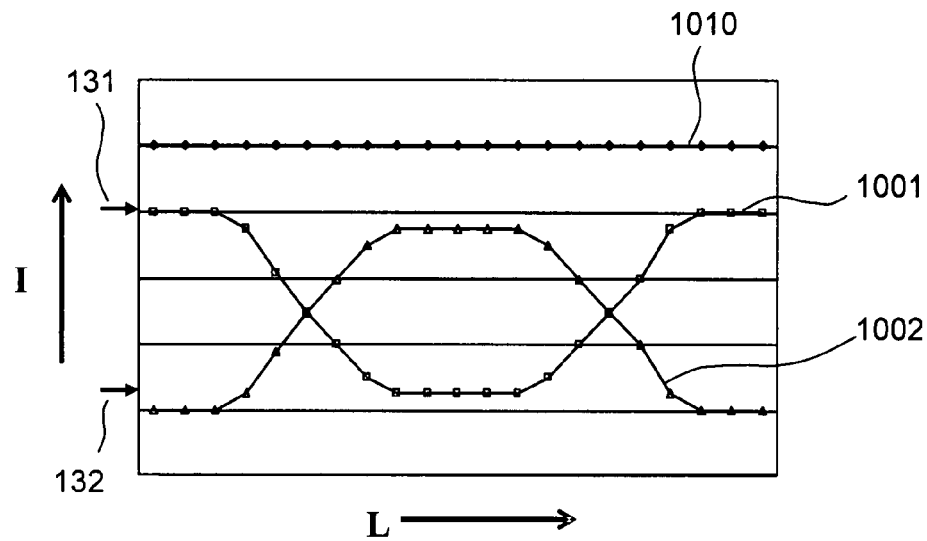
FIG. 1C shows the luminance distribution on the radiation coupling-out surface of a device in accordance with one exemplary embodiment.

FIGS. 1A and 1B show an exemplary embodiment of a device 100 for emitting a first and a second electromagnetic radiation 13, 23. FIG. 1C shows the luminance distribution of the first and second electromagnetic radiation 13, 23 on the radiation coupling-out surface 5 of the device 100. In this case, the illustrations shown in FIGS. 1A and 1B correspond to sectional illustrations of the device 100 along the sectional planes respectively designated by AA and BB in the respective other figure. The following description of the device relates equally to FIGS. 1A to 1C.

The device 100 has a first arrangement 1, which emits a first electromagnetic radiation 13. In this case, the first arrangement 1 comprises first radiation-emitting components 10 arranged on two opposite lateral surfaces 31, 32 of a radiation-directing element, which is embodied as a light guide 3. The geometry of the light guide can be characterized in a simplifying manner by a virtual surface F, which is embodied as a plane in the exemplary embodiment shown. In this case, the first radiation-emitting components 10 are arranged along the entire lateral surfaces 31, 32 along the surface F in such a way that the first electromagnetic radiation 13 can be coupled into the light guide in each case via the entire lateral length of the sides 31, 32. For this purpose, the first radiation-emitting components 10 are embodied for example as cold cathode fluorescence lamps (CCFL) which in each case extend over the entire lateral surfaces 31, 32. As an alternative or in addition, the first radiation-emitting components 10 can also have LEDs or preferably LED arrays which are arranged in addition to or instead of the CCFL at the sides 31, 32 of the light guide 3. Particularly in the exemplary embodiment shown with CCFL as first radiation-emitting components 10, the first radiation-emitting arrangement 1 furthermore has reflector housings 11 shaped such that the entire first electromagnetic radiation 13 emitted by the first radiation-emitting components 10 is emitted toward the light guide 3 and collimated. Through the reflector housings 11, first electromagnetic radiation 13 which is not emitted in the direction of the light guide 3 by the usually cylindrically symmetrically emitting CCFL can also be directed toward the light guide 3 and be coupled into the latter. In this case, the first radiation-emitting components 10 are arranged at the lateral surfaces 31, 32 in such a way that they have beam paths running toward one another.

The light guide 3 has a main surface 35 formed as a radiation exit surface of the light guide. In this case, the radiation exit surface 35 of the light guide 3 forms the radiation coupling-out surface 5 of the device 100 in the exemplary embodiment shown. Furthermore, the light guide 3 has a main surface 33 arranged opposite the radiation exit surface 35, said main surface being formed as a rear-side surface 33. Centrally with respect to the sides 31, 32 on the main surface 33, that is to say the rear-side surface 33, the device 100 furthermore has a second radiation-emitting arrangement 2, which emits a second electromagnetic radiation 23. The second radiation-emitting arrangement 2 has second radiation-emitting components 20, which, in the exemplary embodiment shown, can be for instance a sheet-like arrangement of LEDs, that is to say an LED array or a plurality of CCFL. The second radiation-emitting components 20 are arranged in a reflector box 21, which has reflective inner walls and is open toward the light guide, such that the second electromagnetic radiation 23 is emitted toward the light guide 3 and in particular toward the surface 33 and the light guide 3 is therefore disposed downstream of the second radiation-emitting arrangement 2.

As described above, the first electromagnetic radiation 13 is preferably emitted parallel to the main extension direction of the radiation coupling-out surface 5 of the device 100, indicated by the arrow L, toward the light guide 3 and coupled into the latter. However, the light guide 3 has on the main surface 33 a reflective layer extending over the entire surface 33 apart from the region in which the reflector box 21 is arranged. As a result, electromagnetic radiation which does not propagate in the direction of the radiation exit surface 35 but rather in the direction toward the rear-side main surface 33 in the light guide 3 can be directed from said main surface to the radiation exit surface 35. The first electromagnetic radiation 13 can advantageously be coupled out via the partial region 51, which comprises the entire radiation exit surface 35 in the exemplary embodiment shown, from the light guide 3 and be emitted by the latter. In this case, the light guide 3 is formed and shaped such that the first electromagnetic radiation 13 can be emitted via the radiation exit surface 35 of the light guide 3 and thus via the radiation coupling-out surface 5 of the device 100 as far as possible with a homogeneous luminance distribution. For this purpose, the surface 33 can be tilted for instance with respect to the radiation exit surface 35 and/or have a stepped or prism structuring. Such shaping of the surface 33 is suitable, in particular, for directing the first electromagnetic radiation 13 as uniformly as possible with regard to the main extension direction L of the radiation exit surface 35 toward the radiation exit surface 35.

The second electromagnetic radiation 23 is coupled into the light guide 3 via the surface 33 and coupled out via the radiation exit surface 35 in the partial region 52, which extends over the entire radiation coupling-out surface 5 like the first partial region. In the case of the exemplary embodiment shown, the first and second partial regions 51, 52 thus overlap. The electromagnetic radiation 53 coupled out from the device 100 via the radiation coupling-out surface 5 therefore has a mixing of the first and second electromagnetic radiation 13, 23 via the entire radiation coupling-out surface 5, wherein, as explained in connection with FIG. 1C, the relative proportions of the first and second electromagnetic radiation 13, 23 vary along the main extension direction L over the radiation coupling-out surface. The electromagnetic radiation 53 emitted by the radiation coupling-out surface 35 is emitted along a device beam path.

The light guide 3 has a transparent material suitable for conducting and transmitting the first and the second electromagnetic radiation 13, 23. By way of example, the light guide 3 is produced from a plastic suitable for a shaping process, for instance PMMA or polycarbonate.

The first and second radiation-emitting arrangements 1, 2 preferably emit the same or a similar electromagnetic radiation, in particular an electromagnetic radiation which can give an observer a white or whitish luminous impression. In order to give an observer a white luminous impression that is as homogeneous as possible, it can be advantageous if the first and the second electromagnetic radiation 13, 23 preferably comprise identical or virtually identical wavelengths with an identical or at least similar respective intensity. In this case, the white or whitish luminous impression can range from cold-white to warm-white. If LEDs for instance in the form of an LED array are used for example as second radiation-emitting components, then the LEDs either have in each case a white emission spectrum or an LED array comprises a plurality of LEDs having differently colored emission spectra which, in a superposition, lead to the white or whitish luminous impression. Through the use of an LED array, the luminous impression can in this case be varied by targeted driving of the individual LEDs.

By virtue of the fact that the second radiation-emitting arrangement 2 is not arranged at the lateral surfaces 31, 32 but rather is arranged at a main surface, preferably centrally, a very small structural depth near the sides 31, 32 can be achieved in particular also by means of the lateral arrangement of the first radiation-emitting arrangement 1 in a plane with the light guide 3. The structural depth near the sides 31, 32 is essentially given by the thickness of the light guide 3 in this region and the width of the first radiation-emitting arrangement 1. A thermal optimization is possible as a result since the first and second radiation-emitting components 10, 20 can be positioned in an optimized manner and specifically from thermal standpoints and also with regard to the luminous intensity and the waste heat generated by the radiation-emitting components 10, 20 during operation can be dissipated separately from one another. Furthermore, through the use of the first and second radiation-emitting arrangements, the ageing of first and/or second radiation-emitting components can be compensated for by individual driving of the radiation-emitting components.

The graph shown in FIG. 1C illustrates the mode of operation of the device 100 with regard to a homogeneous luminance distribution over the radiation coupling-out surface 5. In this case, the x axis, designated by L, indicates the position on the radiation coupling-out surface 5 in the direction of the main extension direction thereof, shown by the arrow L in FIG. 1A. In this case, the x axis extends from the side 31 of the light guide 3 to the side 32. The first partial region 51 and the second partial region 52 are furthermore indicated. The y axis, designated by l, is a measure of the luminous intensity of the electromagnetic radiation emitted by the radiation coupling-out surface 5.

In this case, the curve 1001 denotes the luminous intensity of first electromagnetic radiation 13. It can be discerned that through the light guide 3, the first electromagnetic radiation 13 can be emitted near the sides 31, 32 with a homogeneous luminous intensity. In this case, the luminous intensity in the first partial region 51 can be characterized by a first luminous intensity 131. Toward the center of the radiation coupling-out surface 5, which corresponds to the center of the axis designated by L, the first electromagnetic radiation has a luminous intensity gradient, wherein the luminous intensity falls to a second luminous intensity 132, which is less than half of the maximum luminous intensity 131. Consequently, the radiation from the first radiation-emitting arrangement 1 is preferably emitted from the radiation coupling-out surface 5 near the sides 31, 32.

The curve 1002, by contrast, denotes the luminous intensity of the second electromagnetic radiation 23 on the radiation coupling-out surface 5 along the main extension direction L. By virtue of the arrangement and configuration of the second radiation-emitting arrangement, the second electromagnetic radiation 23 is preferably emitted in the central region of the radiation coupling-out surface 5.

The curve 1010 shows the luminous intensity of the total electromagnetic radiation 53 emitted by the radiation coupling-out surface 5, which is a mixture of the first and second electromagnetic radiation 13, 23. It can be discerned that through the superposition of the first and second partial regions, a homogeneous luminance distribution can be achieved over the entire radiation coupling-out surface 5.

Through the combination of the first and second radiation-emitting arrangements 1, 2, it is advantageously possible to achieve, in conjunction with a high homogeneity of the luminance distribution on the radiation coupling-out surface 5, a high luminance with a small number of radiation-emitting components 10, 20, whereby economic operation of the device 100 is made possible.

The exemplary embodiments shown in conjunction with the following figures relate to extensions and modifications of the exemplary embodiment shown in conjunction with FIGS. 1A to 1C, such that these extensions and modifications are principally discussed in the following exemplary embodiments.

Figure 2:
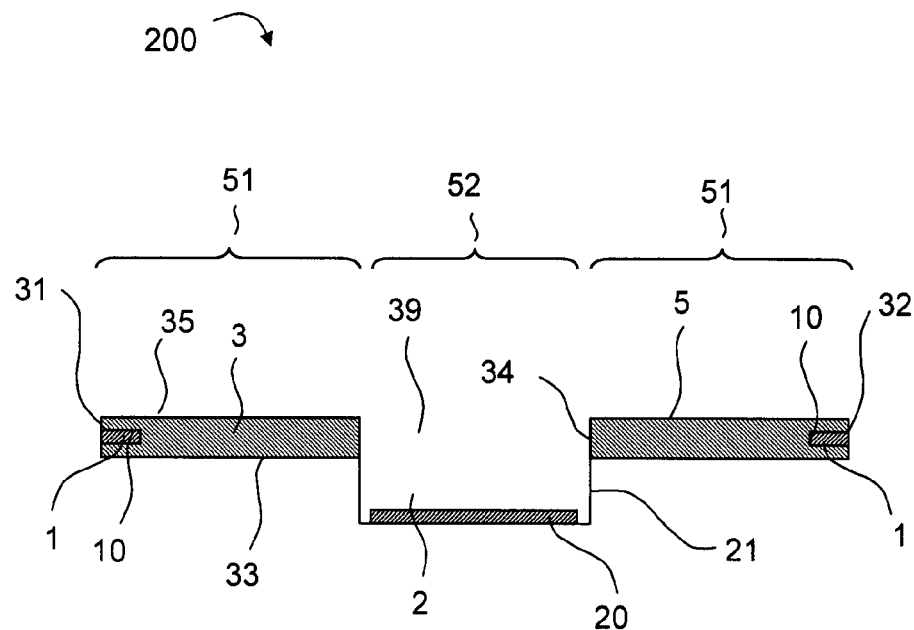
FIGS. 2 to 9 show schematic illustrations of different embodiments of devices according to the invention.

The exemplary embodiment of a device 200 as shown in FIG. 2 has a light guide 3 with an opening 39. In this case, the opening 39 is disposed downstream of the second radiation-emitting arrangement 2 and is arranged in the beam path of said arrangement. In this case, the opening 39 covers the opening of the reflector box 21. As a result, the second electromagnetic radiation can be emitted directly, that is to say without being coupled into and out of the light guide 3, by the device 200.

In particular, the opening 39 is delimited by sidewalls 34. The number of sidewalls 34 depends on the form of the opening 39, which can be rectangular for example in the exemplary embodiment shown. In this case, the sidewalls 34 are covered with a reflective layer (not shown) and therefore have a reflective coating, for example a metal reflective coating. In this case, the reflective coating is formed as a reflector film or alternatively as a mirror and in the exemplary embodiment shown is configured in such a way that the second electromagnetic radiation, which impinges on the lateral surfaces 34 in the opening 39, can be reflected. As a result, the reflector box 21 of the second radiation-emitting arrangement 2 is placed effectively at the radiation exit surface 35 of the light guide 3, such that the depth of the reflector box 21 and hence the depth of the second radiation-emitting arrangement 2 can be reduced.

As an alternative or in addition, the reflective coating of the lateral surfaces 34 can also face the light guide 3, such that the first electromagnetic radiation, which impinges on the reflective coating within the light guide 3, can be reflected back into the light guide 3. As a result, it is possible to achieve an increase in the efficiency of the light guide 3 through an increase in the luminance of the first electromagnetic radiation which is coupled out through the radiation exit surface 35.

In particular, a reflective coating of the lateral surfaces 34 can prevent the second electromagnetic radiation from being coupled into the light guide 3 via the sidewalls 34 and the first electromagnetic radiation from being coupled out from the light guide 3 through the sidewalls 34. If such an effect is actually not desired, a reflective coating of the lateral surfaces 34 can also be dispensed with. In the exemplary embodiment shown, the opening 39 forms a second partial region 52 of the radiation coupling-out surface 5, while the radiation exit surface 35 of the light guide 3 forms a first partial region 51. In this case, the first partial region 51 adjoins the second partial region 52 and encloses the latter, the first and the second partial region 51, 52 being different from one another.

In the exemplary embodiments shown, the second radiation-emitting arrangement 2 has a sheetlike radiation-emitting component 20, for instance a flat fluorescence lamp (FFL). As an alternative or in addition, the radiation-emitting component 20 configured in sheet-like fashion can also have or be an OLED or an electroluminescence film.

Furthermore, in the exemplary embodiment shown, the lateral surfaces 31, 32 of the light guide 3 are configured in such a way that the first radiation-emitting arrangement 1 and in particular the first radiation-emitting components 10 are at least partly enclosed by the light guide 3, whereby the first electromagnetic radiation can be coupled efficiently into the light guide 3. In this case, the first radiation-emitting arrangement 1 can furthermore also have a reflector box or reflective coatings of the radiation-emitting components 10 or of the light guide sides 31, 32 (not shown).

Figure 3:
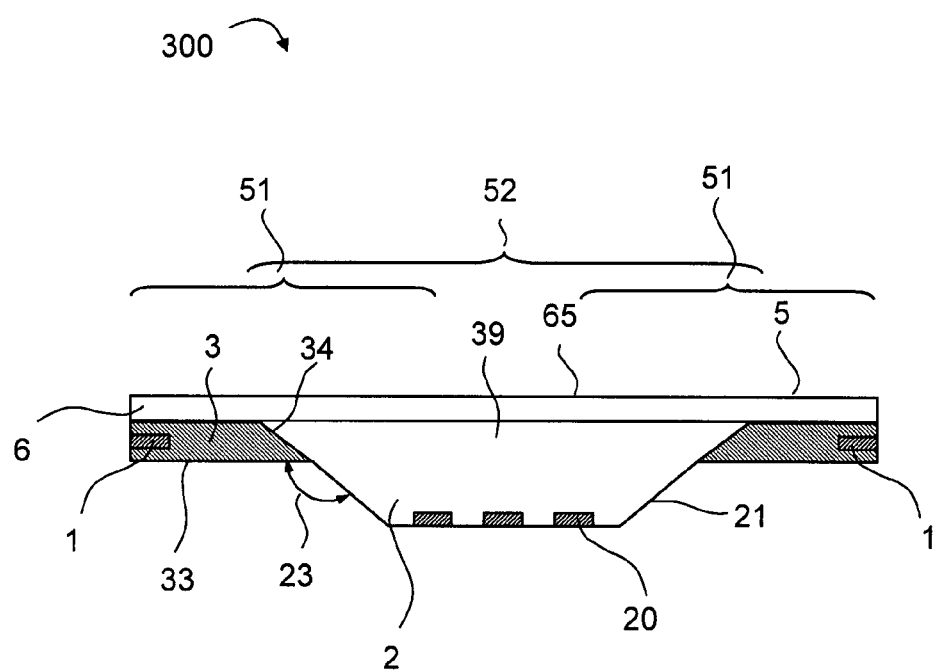

The exemplary embodiment of a device 300 as shown in FIG. 3 has an opening 39 in the light guide 3, in a manner similar to the preceding exemplary embodiment. In the case of the device 300, however, the second radiation-emitting arrangement 2 has a reflector 21 with inclined lateral surfaces which continue as lateral surfaces 34 of the opening 39 in the light guide 3. The lateral surfaces of the box-type reflector 21 form an angle 23 with the rear-side surface 33 of the light guide 3, which angle, with a value of approximately 135 degrees, is greater than 90 degrees in the exemplary embodiment shown. As an alternative, the angle 23 can have a different value greater than 0 and less than 180 degrees. By virtue of an angle 23 that is greater than 90 degrees, a second electromagnetic radiation can be emitted by a larger partial region 52 of the radiation coupling-out surface 5 without having to alter the number, size or distribution of the second radiation-emitting components 20 in comparison with the previous exemplary embodiments. The lateral surfaces 34 can be reflectively coated as in the previous exemplary embodiment.

A diffuser 6 is arranged above the light guide 3 with the opening 39, said diffuser making it possible to increase the homogeneity of the luminance of the first and second electromagnetic radiation with regard to a spatial distribution and an angular distribution. In this case, that side 65 of the diffuser which is remote from the light guide 3 forms the radiation coupling-out surface 5 of the device 300. The first and second partial regions 51, 52 of the radiation coupling-out surface 5 partly overlap. The diffuser 6 can be configured in accordance with one of the embodiments described in the general part. In particular, the diffuser 6 can also alternatively be integrated into the light guide 3; that means that the light guide 3 and the diffuser 6 are formed in one piece and the diffuser 6 also has radiation-conducting properties.

Figure 4:
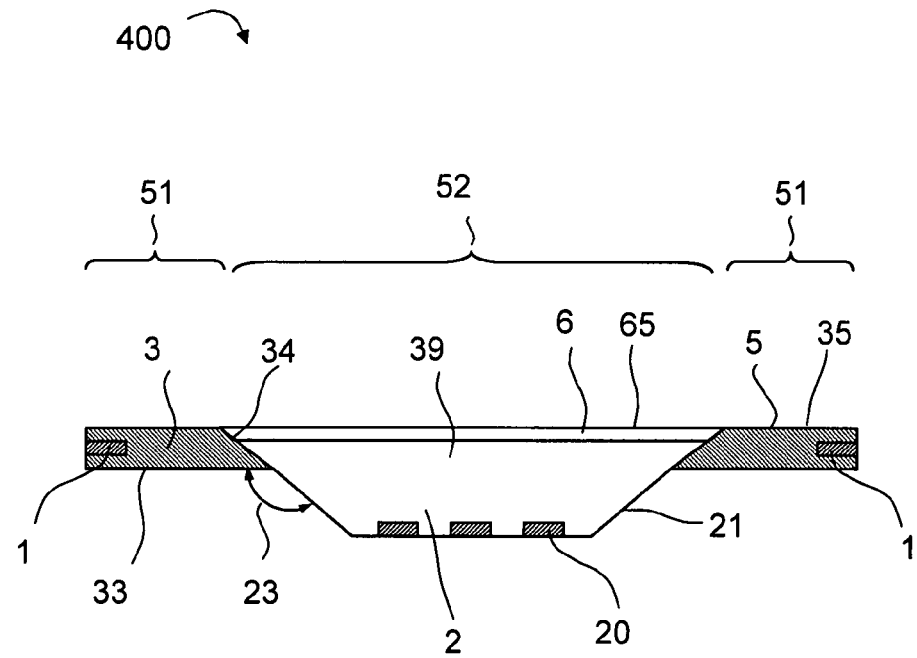

The exemplary embodiment in accordance with FIG. 4 shows a device 400 in which a diffuser 6 is fitted into the opening 39 of the light guide 3 and is thereby integrated into the light guide opening 39. In this case, in the case of a reflector box 21 having beveled sidewalls which continue in beveled sidewalls 34 of the opening 34, the diffuser 6 can also be suitably beveled in order to be able to be integrated into the opening 39 with an accurate fit. In addition, the diffuser 6 for increasing the stability with the light guide 3 can be arranged not only in a positively locking manner but also in a cohesively joined manner, for example by adhesive bonding.

By means of the diffuser 6 in the opening 39, precisely the luminance of the second electromagnetic radiation emitted by the second radiation-emitting arrangement 2 can be homogenized with regard to a spatial and angular distribution. In particular, that may be advantageous if, as in the exemplary embodiment shown, an LED array is used as second radiation-emitting component 20 and the individual LEDs are not intended to be recognizable as separate radiation sources by an observer. In addition, the light guide 3 can have a further diffuser for example as radiation exit surface 35. That side 65 of the diffuser which is remote from the second radiation-emitting arrangement 2 and also the radiation exit surface 35 of the light guide 3 in this case form the radiation coupling-out surface 5 of the device 400.

Figure 5:
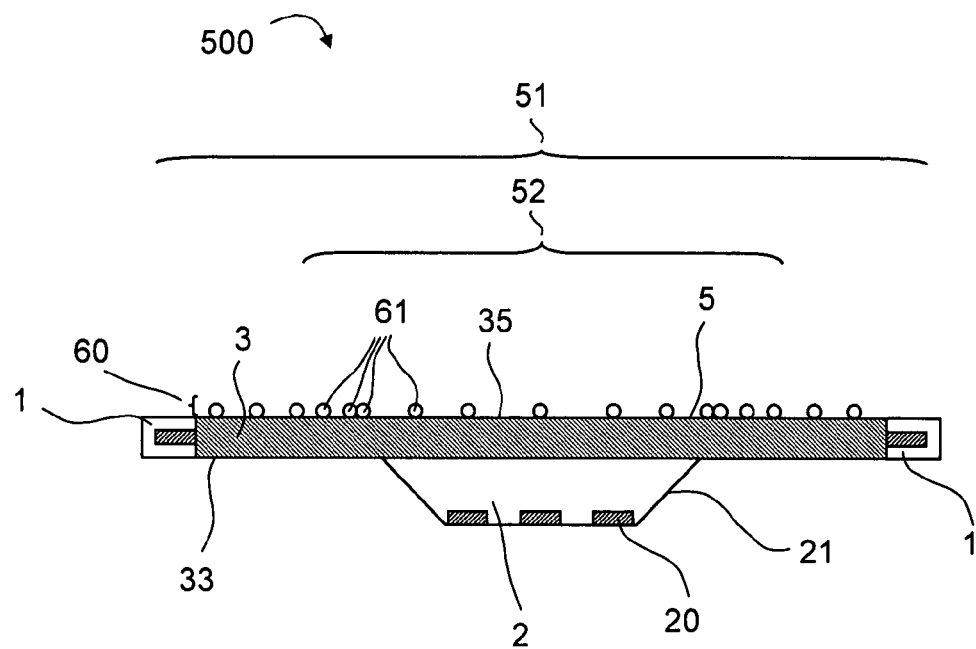

The exemplary embodiment in accordance with FIG. 5 shows a device 500 having a light guide 3, in the case of which the radiation exit surface 35, which forms the radiation coupling-out surface 5 of the device 500, has a structuring 60. In this case, the structuring 60 has refractive elements 61, for example in the form of so-called micro-dots, which are suitable for increasing the probability of electromagnetic radiation being coupled out from the light guide 3. In this case, the electromagnetic radiation is preferably first electromagnetic radiation which is coupled into the light guide 3 by the first radiation-emitting arrangement 1 as far as possible parallel to the radiation exit surface 35. By means of the micro-dots 61 and a suitable distribution thereof on the radiation exit surface 35, it is advantageously possible to promote a homogeneous luminance distribution preferably of the first electromagnetic radiation coupled out from the radiation coupling-out surface 5 of the device 500. Furthermore, the coupling-out probability for the second electromagnetic radiation can also be influenced by the micro-dots 61. By means of a suitable distribution of the micro-dots 61, it is also possible to achieve an improved intermixing of the first and second electromagnetic radiation in particular in partial regions that cover the first and the second partial region.

As an alternative or in addition, the structuring 60 can have reflective elements 61 in the form of micro-dots, for example, which reflects radiation coupled out from the light guide 3 through the radiation exit surface 35 back into the light guide again. In particular, a structuring 60 having reflective elements 61 is thereby also suitable for distributing electromagnetic radiation, for instance first electromagnetic radiation, more homogeneously within the light guide 3 and therefore enabling for example a more homogeneous coupling out of the first electromagnetic radiation via the radiation coupling-out surface 5.

The structuring 60 in the form of micro-dots 61 can be integrated as an alternative or in addition also within the light guide 3, or be arranged in addition or as an alternative to a reflective coating of the surface 33 remote from the radiation exit surface 35 on the surface 33.

Furthermore, the structuring 60 can also have elements 61 comprising wavelength conversion substances which can convert the first electromagnetic radiation and/or the second electromagnetic radiation at least partly into electromagnetic radiation having a different color impression than the first and/or second electromagnetic radiation.

Instead of or in addition to the micro-dots 61, the structuring 60 can also have, for example, line-shaped or grooved structures.

Figure 6:
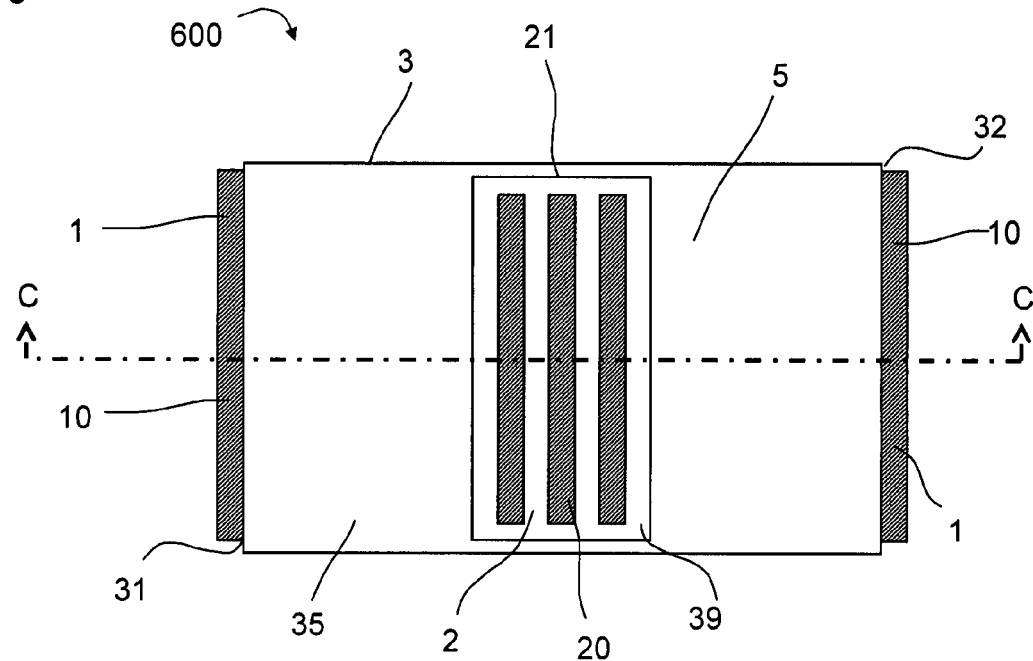

FIG. 6 shows an exemplary embodiment of a device 600 in a plan view of the radiation coupling-out surface 5. In this case, the light guide 3 corresponds to the light guide 3 of the device 200 as shown in the exemplary embodiment in accordance with FIG. 2, wherein the exemplary embodiment of FIG. 2 corresponds to a section of the device 600 along the sectional plane CC as shown in FIG. 6. The device 600 has a light guide 3 having a rectangular form, and at the sides 31, 32 of said light guide a first radiation-emitting arrangement 1, which has CCFL extending over the sides 31, 32. Furthermore, the device 600 has the second radiation-emitting arrangement 2, in the beam path of which is arranged the opening 39 of the light guide 3. The second radiation-emitting arrangement 2 likewise has CCFL as radiation-emitting components 20. In the exemplary embodiment shown, the opening 39 is rectangular, further forms being possible depending on the application.

Devices having a rectangular cross section of the radiation coupling-out surface 5 as shown by the device 600 in conjunction with FIG. 6, for instance, are suitable in particular for large-area display backlighting since, in comparison with conventional backlighting, an economic and cost-effective operation is possible by means of a small number of radiation-emitting components 10, 20 and a small structural depth precisely near the sides 31 and 32. In particular for display applications, for example the second radiation-emitting arrangement 2 can be integrated in a stand of the displays, whereby a space-saving design can be made possible.

Figure 7:
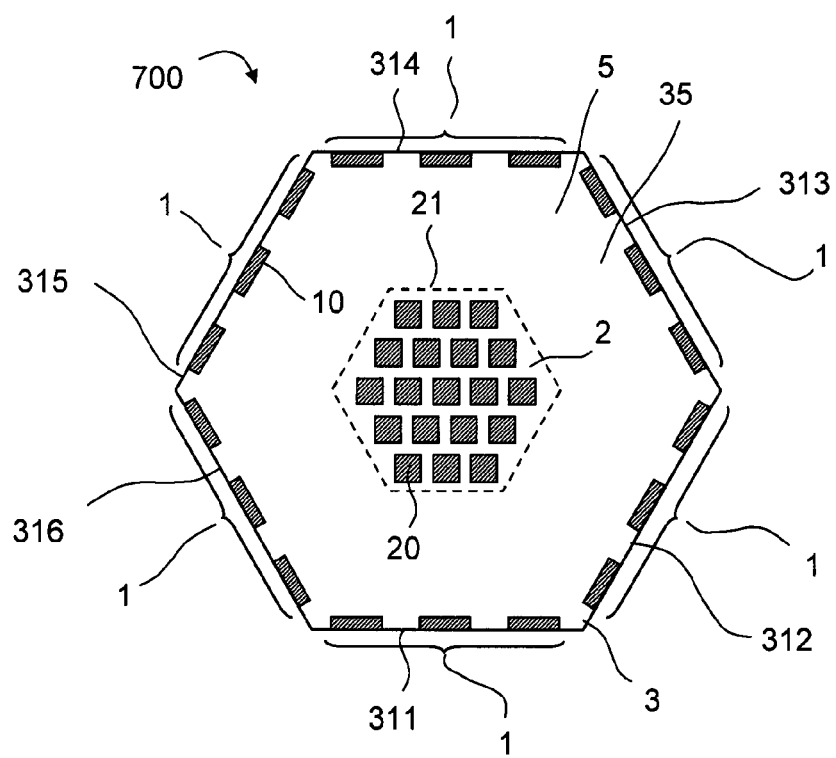

The device 700 in accordance with the exemplary embodiment in FIG. 7 is shown like the preceding exemplary embodiment in a plan view of the radiation coupling-out surface 5, which is formed by the radiation exit surface 35 of the light guide 3. The device 700 has a light guide 3 having a hexagonal form and a first radiation-emitting arrangement 1. The first radiation-emitting arrangement comprises a plurality of radiation-emitting components 10 arranged at each of the sides 311, 312, 313, 314, 315, 316, said components having beam paths that run toward one another. In this case, the radiation-emitting components 10 comprise individual LEDs or LED arrays which are suitable for example for generating white light. In the center of the light guide 3, the second radiation-emitting arrangement 2 is arranged on the rear-side main surface 33 arranged remote from the radiation exit surface 35. Said arrangement has a reflector box 21, which is indicated by the dashed line, and also radiation-emitting components 20, which are for example LEDs or pluralities of LEDs. The second radiation-emitting arrangement 2 is preferably suitable for emitting white light. The device 700 can be used for example as a light tile or as part of a light tile. In particular, the hexagonal form of the device 700 is suitable for arranging a plurality of devices 700 of identical type alongside one another over a large area. As an alternative, the device 700 can also have a different polygonal form for this purpose.

As an alternative, the first and/or the second radiation-emitting arrangement 1, 2 can also emit colored light. Particularly when the device 700 is used as a light tile, it may be desirable for the first radiation-emitting arrangement 1 and the second radiation-emitting arrangement 2 to emit respectively a first and a second electromagnetic radiation which can give an observer a different color impression and/or a different brightness impression. It may also be desirable for the first radiation-emitting components 10 and/or the second radiation-emitting components 20 to be able to give an observer different color impressions and/or different brightness impressions for example by means of a variable driving.

Figure 8:
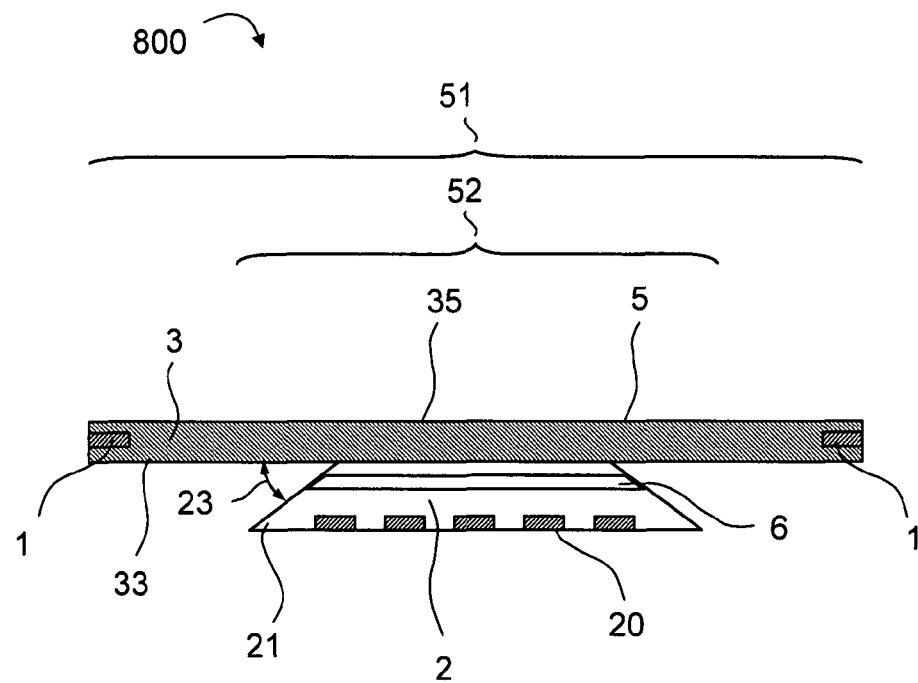

The exemplary embodiment in accordance with FIG. 8 shows a device 8 which can be used for example as a light tile or as part thereof. In this case, the light guide 3, the form of the radiation coupling-out surface 5 and also the first radiation-emitting arrangement 1 can have for example features in accordance with the previous exemplary embodiment. In particular, the device 800 has a second radiation-emitting arrangement 2 with a reflector box 21, which tapers from the radiation-emitting components 20, which are formed as LEDs, toward the light guide 3 in terms of its cross-sectional area, such that the sidewalls of the reflector box 21 form an angle 23 with the surface 33 of the light guide, which angle is less than 90 degrees. As a result, it is advantageously possible to increase the luminous intensity of the second radiation-emitting arrangement 2 in the region 52.

Furthermore, in the reflector box 21 a diffuser 6 is arranged in the beam path of the second radiation-emitting components 20, which enables a homogeneous emission of the second electromagnetic radiation by the second radiation-emitting arrangement 2, such that the individual second radiation-emitting components 20 are no longer recognizable as individual radiation sources for an observer. A second radiation-emitting arrangement 2 of this type may be advantageous, for instance, for giving an observer of the device 800 an inhomogeneous brightness impression and/or color impression. In particular, the second partial region 52 of the radiation coupling-out surface 5 can have a higher or a lower luminous intensity than the first partial region 51. The first and/or the second radiation-emitting components 10, 20 can emit colors that are respectively different from one another, such that a variable color mixing in accordance with the gamut predetermined by the first and/or second radiation-emitting components 10, 20 is made possible by means of a targeted regulation of the individual first and/or second radiation-emitting components 10, 20.

Figure 9:
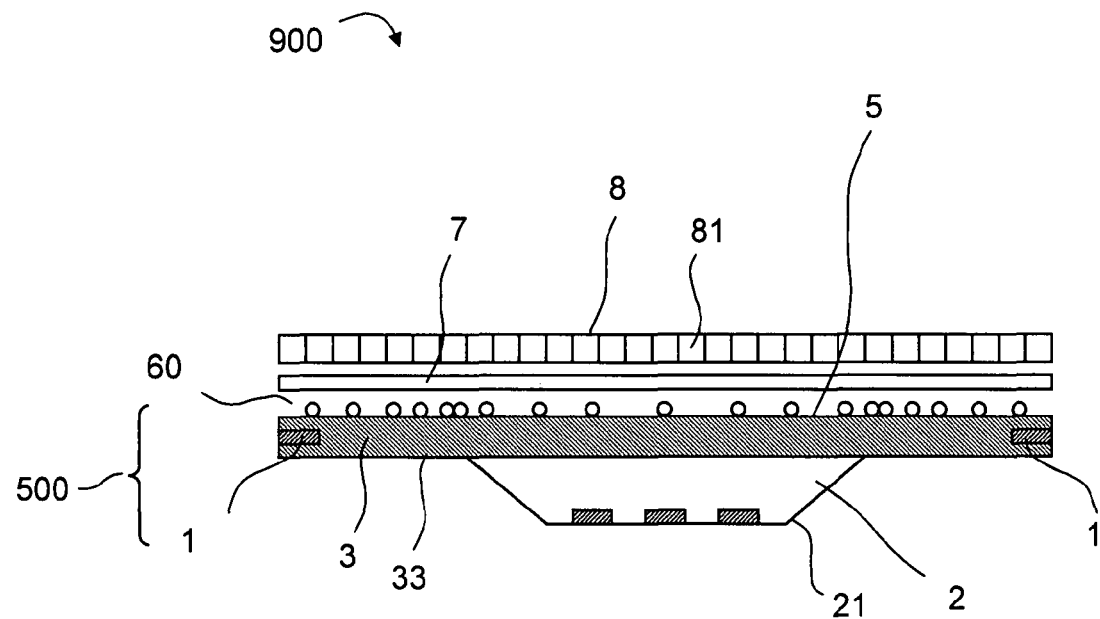

FIG. 9 shows an exemplary embodiment of a display device 900. The display device 900 comprises, by way of example, a device 500 in accordance with the exemplary embodiment in FIG. 5. As an alternative, the device 500 can have further or alternative features of at least one of the other exemplary embodiments shown above or in accordance with the embodiments in the general part of the description. An optical element 7 and a liquid crystal matrix 8 are disposed downstream of the radiation coupling-out surface 5 of the device 500 in the device beam path thereof. The liquid crystal matrix can be embodied in active or passive fashion and has pixels or sub-pixels 81.

The optical element 7 can have for example a diffuser or a coupling-out structure in order to enable the first and second electromagnetic radiation to be emitted as homogeneously as possible. For this purpose, the optical element 7 can have a microprism structuring, for example. Furthermore, the optical element 7 can have a polarizer or polarization filter, for example, which is preferably configured in such a way that electromagnetic radiation with a polarization direction is transmitted through the optical element 7, while the electromagnetic radiation with a polarization direction orthogonal with respect thereto is reflected back to the device 500. The reflected electromagnetic radiation can then be reflected in the direction of the optical element 7 again for example at that surface 33 of the light guide 3 which is remote from the radiation coupling-out surface 5, or at the reflector box 21 of the second radiation-emitting arrangement 2. Upon passing for example through the light guide 3 and/or through the structuring 60 and/or through the reflection at the surface 33 or the light box 21, it can be possible for the polarization direction to be changed to the effect that the electromagnetic radiation can now pass through the optical element 7. As a result, it is possible to achieve an increase in the luminance of the display device 900 in conjunction with a homogeneous luminance distribution in comparison with a similar display device without an optical element 7.

The invention is not restricted to the exemplary embodiments by the description on the basis of said exemplary embodiments. Rather, the invention encompasses any new feature and also any combination of features, which in particular comprises any combination of features in the patent claims, even if this feature or this combination itself is not explicitly specified in the patent claims or exemplary embodiments.

We claim:

1. A device for emitting a first and a second electromagnetic radiation via a radiation coupling-out surface along a device beam path, comprising:

a first radiation-emitting arrangement having at least one first radiation-emitting component which emits the first electromagnetic radiation, the first electromagnetic radiation being emitted via a first partial region of the radiation coupling-out surface;

a second radiation-emitting arrangement having at least one second radiation-emitting component which emits the second electromagnetic radiation, the second electromagnetic radiation being emitted via a second partial region of the radiation coupling-out surface; and a radiation-directing element;

wherein the radiation coupling-out surface is arranged in a beam path of the second radiation-emitting arrangement;

wherein the radiation-directing element directs the first electromagnetic radiation to the radiation coupling-out surface; and wherein the first partial region and the second partial region are at least partly different from one another.

2. The device as claimed in claim 1, wherein the first electromagnetic radiation is directed in the direction of the beam path of the second electromagnetic radiation by the radiation-directing element.

3. The device as claimed in claim 1, wherein the first radiation-emitting arrangement is arranged laterally offset with respect to the radiation coupling-out surface.

4. The device as claimed in claim 1, wherein the radiation-directing element has lateral surfaces and main surfaces, and wherein the first electromagnetic radiation is radiated into the radiation-directing element by the first radiation-emitting arrangement via a lateral surface and is directed toward a main surface.

5. The device as claimed in claim 1, wherein the first partial region and the second partial region at least partly overlap.

6. The device as claimed in claim 1, wherein the second partial region is delimited by the first partial region on at least two sides.

7. The device as claimed in claim 1, wherein the first electromagnetic radiation has a first luminance in the first partial region and a second luminance, which is lower than the first luminance, in the second partial region.

8. The device as claimed in claim 5, wherein the radiation-directing element is arranged in the beam path of the second radiation-emitting arrangement.

9. The device as claimed in claim 1, wherein the radiation-directing element has a light guide having:

a radiation entrance surface, via which the first electromagnetic radiation is coupled into the light guide, and a radiation exit surface.

10. The device as claimed in claim 9, wherein the light guide has a surface which is opposite to the radiation exit surface and via which the second electromagnetic radiation is at least partly coupled into the light guide.

11. The device as claimed in claim 9, wherein the radiation exit surface forms at least one part of the radiation coupling-out surface.

12. The device as claimed in claim 9, wherein the radiation entrance surface is not parallel to the radiation coupling-out surface.

13. The device as claimed in claim 9, wherein the light guide comprises a plastic.

14. The device as claimed in claim 9, wherein the light guide at least partly has a reflective layer or a reflective component on a surface opposite to the radiation exit surface.

15. The device as claimed in claim 9, wherein the light guide has an opening.

16. The device as claimed in claim 15, wherein the opening is arranged in the beam path of the second electromagnetic radiation.

17. The device as claimed in claim 9, wherein the radiation exit surface forms a main surface of the light guide and is shaped in at least one of a sheet-like and planar manner.

18. The device as claimed in claim 15, wherein the light guide has sidewalls in a region of the opening, the sidewalls adjoining the radiation exit surface and having a reflective layer.

19. The device as claimed in claim 1, wherein at least one of the first radiation-emitting component and the second radiation-emitting component comprises at least one radiation-emitting component from a group formed by:
a cold cathode fluorescence lamp,
a hot cathode fluorescence lamp,
an external electrode fluorescence lamp,
a flat fluorescence lamp,
an electroluminescence film,
an inorganic light-emitting diode, and
an organic light-emitting diode.

20. The device as claimed in claim 1, wherein at least one of the first radiation-emitting arrangement and the second radiation-emitting arrangement has a reflector.

21. The device as claimed in claim 1, wherein a diffuser is arranged in the beam path of at least one of the first and the second electromagnetic radiation.

22. The device as claimed in claim 21, wherein the radiation-directing element comprises the diffuser.

23. The device as claimed in claim 21, wherein the diffuser is disposed downstream of the radiation-directing element.

24. The device as claimed in claim 15, wherein a diffuser is arranged in or above the opening of the light guide.

25. The device as claimed in claim 21, wherein the second radiation-emitting arrangement comprises the diffuser.

26. The device as claimed in claim 21, wherein the diffuser comprises at least one of reflective and refractive structures.

27. The device as claimed in claim 1, wherein the first radiation-emitting arrangement has a plurality of first radiation-emitting components.

28. The device as claimed in claim 27, wherein the first radiation-emitting components have beam paths running toward one another.

29. The device as claimed in claim 28, wherein the radiation-directing element has at least one first and second lateral surface and main surfaces;
wherein at least one of the plurality of the first radiation-emitting components is arranged at a first lateral surface of the radiation-directing element;
wherein at least one further one of the plurality of the first radiation-emitting components is arranged at a second lateral surface of the radiation-directing element; and
wherein the first and the second lateral surface of the radiation-directing element are different from one another.

30. The device as claimed in claim 29, wherein the first lateral surface and the second lateral surface are two sides of the radiation-directing element that are remote from one another.

31. The device as claimed in claim 28, wherein the second radiation-emitting arrangement is arranged at a main surface of the radiation-directing element.

32. The device as claimed in claim 27, wherein the plurality of the first radiation-emitting components of the first radiation-emitting arrangement and the radiation-directing element are arranged along a surface.

33. The device as claimed in claim 32, wherein the surface is a plane.

34. The device as claimed in claim 32, wherein the surface is parallel to the radiation coupling-out surface.

35. The device as claimed in claim 1, wherein the second radiation-emitting arrangement has a plurality of second radiation-emitting components.

36. The device as claimed in claim 1, wherein a polarizer is disposed downstream of the radiation coupling-out surface.

37. The device as claimed in claim 1, wherein the radiation coupling-out surface gives an external observer a homogeneous luminous impression.

38. The device as claimed in claim 1, wherein the radiation coupling-out surface gives an external observer an inhomogeneous luminous impression.

39. The device as claimed in claim 1, wherein the radiation-directing element directs the first electromagnetic radiation to the radiation coupling-out surface such that the beam path of the first and the second radiation-emitting arrangement is converted into a common device beam path of the device.

40. A display device, comprising:
a device as claimed in claim 1; and
a liquid crystal matrix disposed downstream of the radiation coupling-out surface in the beam path of the device.

41. A device for emitting a first and a second electromagnetic radiation via a radiation coupling-out surface along a device beam path, comprising:
a first radiation-emitting arrangement having at least one first radiation-emitting component which emits the first electromagnetic radiation, the first electromagnetic radiation being emitted via a first partial region of the radiation coupling-out surface;
a second radiation-emitting arrangement having at least one second radiation-emitting component which emits the second electromagnetic radiation, the second electromagnetic radiation being emitted via a second partial region of the radiation coupling-out surface; and
a radiation-directing element;
wherein the radiation coupling-out surface is arranged in a beam path of the second radiation-emitting arrangement;
wherein the radiation-directing element directs the first electromagnetic radiation to the radiation coupling-out surface; and
wherein the second partial region is delimited by the first partial region on at least two sides.

42. A device for emitting a first and a second electromagnetic radiation via a radiation coupling-out surface along a device beam path, comprising:
a first radiation-emitting arrangement having at least one first radiation-emitting component which emits the first electromagnetic radiation;
a second radiation-emitting arrangement having at least one second radiation-emitting component which emits the second electromagnetic radiation; and
a radiation-directing element comprising:
a light guide having a radiation entrance surface, via which
the first electromagnetic radiation is coupled into the light
guide, a radiation exit surface and an opening;
wherein the radiation coupling-out surface is arranged in a beam path of the second radiation-emitting arrangement; and
wherein the radiation-directing element directs the first electromagnetic radiation to the radiation coupling-out surface.

43. A device for emitting a first and a second electromagnetic radiation via a radiation coupling-out surface along a device beam path, comprising:
- a first radiation-emitting arrangement having at least one first radiation-emitting component which emits the first electromagnetic radiation;
- a second radiation-emitting arrangement having at least one second radiation-emitting component which emits the second electromagnetic radiation;
- a radiation-directing element; and
- a diffuser arranged in a beam path of at least one of the first and the second electromagnetic radiation;
- wherein the radiation coupling-out surface is arranged in a beam path of the second radiation-emitting arrangement; and
- wherein the radiation-directing element directs the first electromagnetic radiation to the radiation coupling-out surface.

44. A device for emitting a first and a second electromagnetic radiation via a radiation coupling-out surface along a device beam path, comprising:
- a first radiation-emitting arrangement having at least one first radiation-emitting component which emits the first electromagnetic radiation;
- a second radiation-emitting arrangement having at least one second radiation-emitting component which emits the second electromagnetic radiation; and
- a radiation-directing element;
- wherein the radiation coupling-out surface is arranged in a beam path of the second radiation-emitting arrangement; and
- wherein the radiation-directing element directs the first electromagnetic radiation to the radiation coupling-out surface; and
- wherein a structural depth near sides of the device is smaller than a structural depth at a middle and between the sides of the device.

* * * * *